US007892434B2

(12) United States Patent
Lee et al.

(10) Patent No.: US 7,892,434 B2
(45) Date of Patent: Feb. 22, 2011

(54) MICROFLUIDIC PRODUCTION OF MONODISPERSED SUBMICRON EMULSION THROUGH FILTRATION AND SORTING OF SATELLITE DROPS

(75) Inventors: Abraham P. Lee, Irvine, CA (US); Yung-Cheih Tan, St. Louis, MO (US)

(73) Assignee: The Regents of the University of California, Oakland, CA (US)

( * ) Notice: Subject to any disclaimer, the term of this patent is extended or adjusted under 35 U.S.C. 154(b) by 560 days.

(21) Appl. No.: 11/832,894

(22) Filed: Aug. 2, 2007

(65) Prior Publication Data

US 2008/0074449 A1 Mar. 27, 2008

Related U.S. Application Data

(60) Provisional application No. 60/821,221, filed on Aug. 2, 2006.

(51) Int. Cl.
*B01D 11/00* (2006.01)

(52) U.S. Cl. .......................... 210/634; 209/1; 209/155; 209/208; 210/541; 210/600; 210/639; 210/767; 95/31

(58) Field of Classification Search ................. 210/634, 210/639, 767, 541, 600, 748; 209/1, 155, 209/10–12, 208; 264/5–13; 347/54, 55, 347/73–85; 95/31; 204/451
See application file for complete search history.

(56) References Cited

U.S. PATENT DOCUMENTS 4,408,211 A * 10/1983 Yamada ...................... 347/75
4,618,867 A * 10/1986 Gans ...................... 343/781 P
4,638,326 A * 1/1987 Yamada et al. ................ 347/75
4,737,268 A * 4/1988 Giddings .................. 209/12.2
4,746,928 A * 5/1988 Yamada et al. ................ 347/75
4,874,507 A * 10/1989 Whitlock ..................... 209/11
6,595,630 B2 * 7/2003 Jagannathan et al. .......... 347/85
6,632,652 B1 10/2003 Austin et al.
6,936,811 B2 8/2005 Kibar
7,118,196 B2 * 10/2006 Aoshima ..................... 347/55
2004/0065599 A1 4/2004 Lal et al.
2005/0172476 A1 8/2005 Stone et al.
2005/0243144 A1 11/2005 Dean, Jr. et al.

OTHER PUBLICATIONS

Yung-Chieh Tan et al., "Design of microfluidic channel geometries for the control of droplet volume, chemical concentration, and sorting", Lab Chip, 2004, 4, pp. 292-298.

(Continued)

*Primary Examiner*—Joseph W Drodge
(74) *Attorney, Agent, or Firm*—Orrick, Herrington & Sutcliffe LLP

(57) ABSTRACT

Improved systems and methods are provided herein for passively filtering out droplets of different size such as satellite droplets from the generation of primary droplets and use these satellite droplets as the source for monodispersed production of submicron emulsions. The systems and methods described use active flow control to sort droplets of different size into desired collecting zones and use conventional shearing principles, and, as a result, provide 100% filtration of satellite droplets regardless of size differences.

10 Claims, 12 Drawing Sheets

OTHER PUBLICATIONS

Yung-Chieh Tan et al., "Droplet sorting by size in microfluidic channels", 8th International Conference on Miniaturized Systems for chemistry and Life Sciences, Sep. 26-30, 2004, Malmo, Sweden, vol. 2, pp. 536-538.

Takasi Nisisako et al., "Separation of Satellite Droplets Using Branch Microchannel Configuration", Conference on Miniaturized Systems for chemistry and Life Sciences, Sep. 26-30, 2004, Malmo, Sweden, vol. 2, pp. 312-314.

* cited by examiner

MICROFLUIDIC PRODUCTION OF MONODISPERSED SUBMICRON EMULSION THROUGH FILTRATION AND SORTING OF SATELLITE DROPS

CROSS-REFERENCE TO RELATED APPLICATION DATA

This application claims the benefit of U.S. provisional patent application No. 60/821,221, filed Aug. 2, 2006, which application is incorporated herein by reference.

FIELD

The present invention relates to microfluidic droplets, emulsions, submicron particles, nanoparticles, drug encapsulation devices, lab on chip assays, chemical processing, digital fluidic mixing, material synthesis, and emulsion related applications, and, more particularly, to systems and methods that facilitate the microfluidic production of monodispersed submicron emulsion through filtration and sorting of droplets of different sizes.

BACKGROUND

Emulsions are widely used in industries to produce sol-gel, drugs, synthetic materials, and food products. Recent developments in microfluidic emulsion technology provided tools for precise sampling and processing of small reagent volumes. However the monodispersity of droplets smaller than 1 pm is difficult to achieve and the presence of satellite droplets along with large primary droplets produce undesirable volumes and contaminations to sample reagents. The presence of satellite droplets reduces production precision of emulsification products.

Satellite droplets are prevalent in almost all techniques of droplet generation except for a few that are currently patented in inkjet industries. In one filtration system, which uses a planar bifurcating geometry, separation of primary droplets from satellite droplets occurs, but only occasionally. Furthermore, no active control is available.

Current submicron emulsification techniques generally results in large size distributions. There are no known digital mixing techniques for submicron droplets. Currently, emulsions are extracted into different processors to generate the final products. The transport process may result in droplet coalescence and the reduction of the contents encapsulated in emulsions.

Submicron emulsions are commonly used in pharmaceutical, cosmetic, food, and material industries to synthesis drugs, creams, and nanoparticles. Recent developments of droplet microfluidics have further provided tools for digital mixing of reagents in small volumes and have been concurrently used in crystallography, analyzing DNA, and nanoparticle production. Monodispersed submicron emulsions are difficult to create due to the noise generated by the high stress required to produce the small sizes. The creation of submicron droplets generally results in wide size distributions making it difficult to have precise quality control over the emulsification products.

It is desirable to provide a system that allows for active sorting of satellite droplets, and where the individual droplet sizes can be selected to go into the desired processing channels.

SUMMARY

Improved systems and methods are provided herein for passively and actively filtering out droplets of different size such as satellite droplets from the generation of primary droplets and use these satellite droplets as the source for monodispersed production of submicron emulsions. The active or dynamic systems and methods described use active flow control to sort droplets of different sizes into desired collecting zones and use conventional shearing principles, and, as a result, provide 100% filtration of droplets regardless of size differences.

BRIEF DESCRIPTION OF FIGURES

The figures provided herein are not necessarily drawn to scale, with some components and features being exaggerated for clarity. Each of the figures diagrammatically illustrates aspects of the invention. Variation of the invention from the embodiments pictured is contemplated.

DESCRIPTION

Improved systems and methods are provided herein for passively and actively filtering and sorting of droplets of different sizes such as satellite droplets from the generation of primary droplets and use these satellite droplets as the source for monodispersed production of submicron emulsions. The active or dynamic systems and methods described herein use active flow control to sort droplets of different sizes into desired collecting zones and use conventional shearing principles, and, as a result, provide 100% filtration of droplets regardless of size differences.

In contrast to the conventional use of high shear to create submicron droplets, even under no shear conditions, the shape of the interface near the singularity point of viscous liquid thread preferably reaches atomic scales. The continuous breakup of this thread leads to the production of droplets of different sizes and, more particularly, to monodispersed satellite droplets. The sizes of these satellite droplets are in submicron to <100 nm range. The production and sorting of satellite droplets forms the basis for monodispersed generation of nanoparticles. The sorting of the satellite droplets adapts the combination of three fluidic mechanisms: (1) the generation of satellite droplets is controlled by the shear stress balance on the liquid thread; (2) droplets of different sizes separate in channel with controlled shear gradient, and (3) the shear gradient is controlled by the channel geometry.

The droplet filtration technique described herein utilizes the shear gradient created at the junction of a stacked channel geometry to filter 100% of different size droplets such as satellite droplets from the primary drops. The mixing and/or fusion of satellite droplets is achieved through controlled sorting of satellite droplets. Satellite droplets can be adjusted to coalesce through adjusted positioning.

A flow switching technique is also disclosed which enables precise control of the location of satellite droplets wherein the satellite stream can be switched into either the top or the bottom zone to allow satellite droplets to undergo different analytical procedures.

The systems and methods provided herein offer a simple and cheap method for the filtration of droplets of different sizes, with monodispersed droplet sizes in the submicron size range, and a method to digitally mix submicron droplets. Further, the generation technique allows emulsion to be transported directly into the processing unit, which minimizes reagent loss.

Figure 1A:
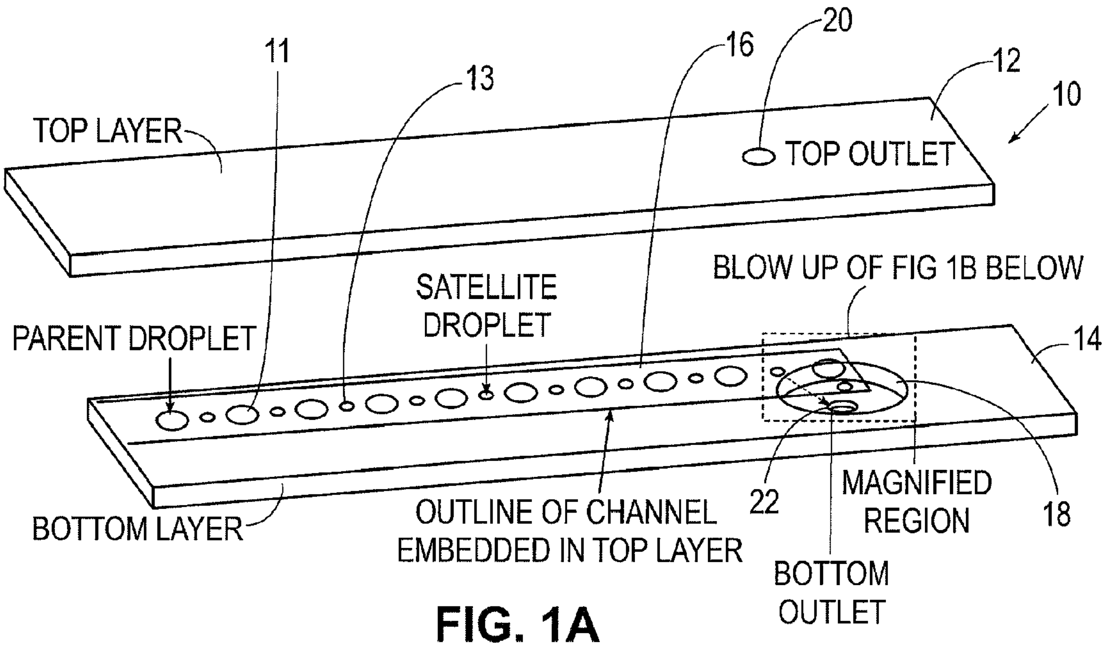
FIGS. 1*a* and 1*b* are solid graphical illustrations showing a satellite droplet filtration device formed in a two layered PDMS structure and FIG. 1*c* is a photograph showing the separation of primary droplets sorted into the top channel and the deposition of satellite droplets into the bottom PDMS layer.
Figure 1B:
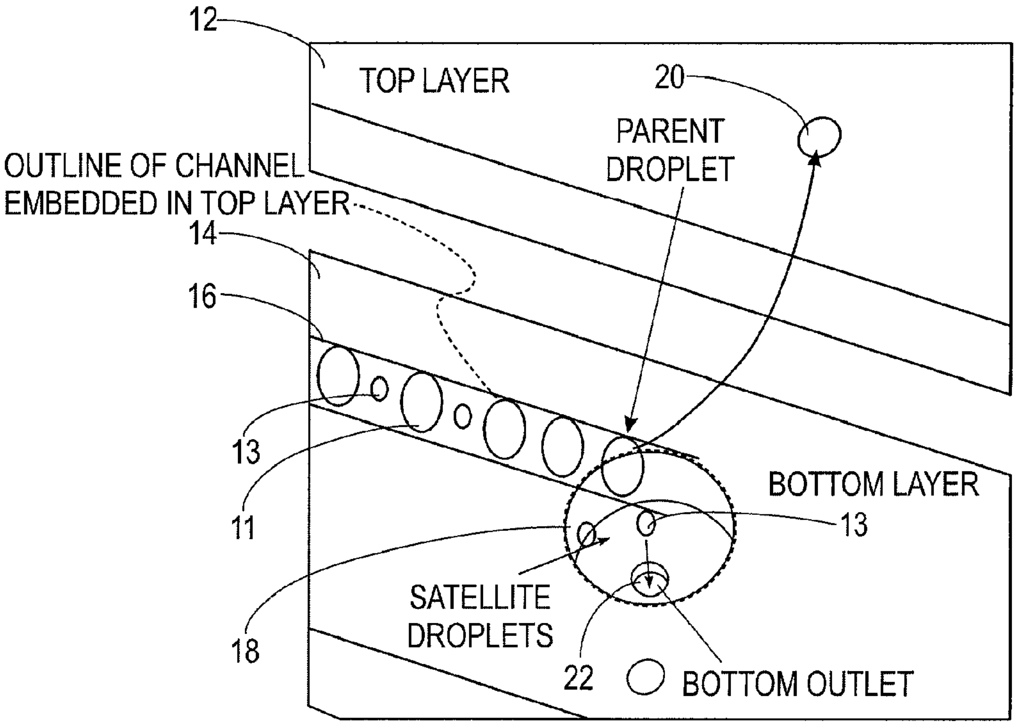
Figure 1C:
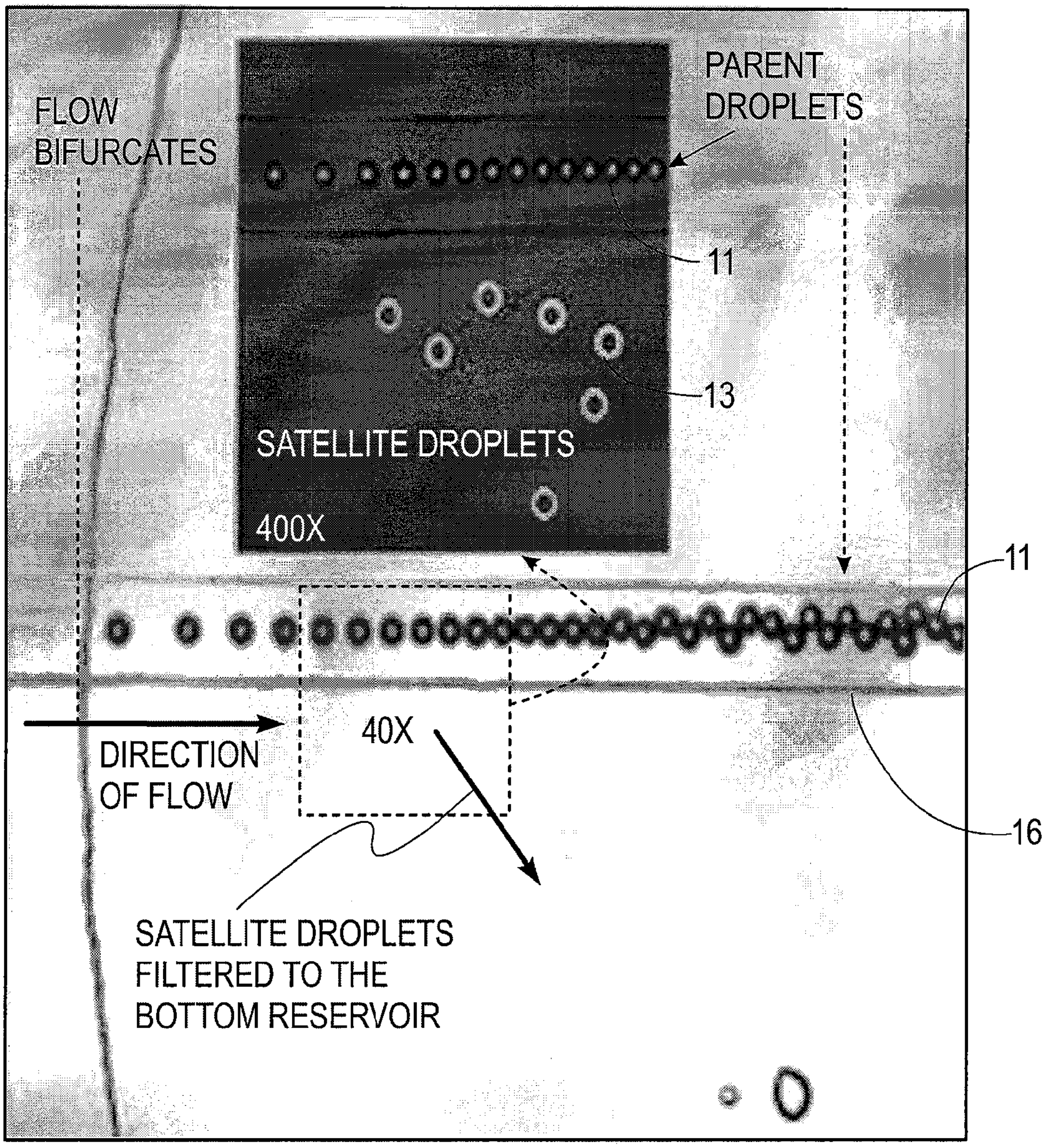
Figure 2:
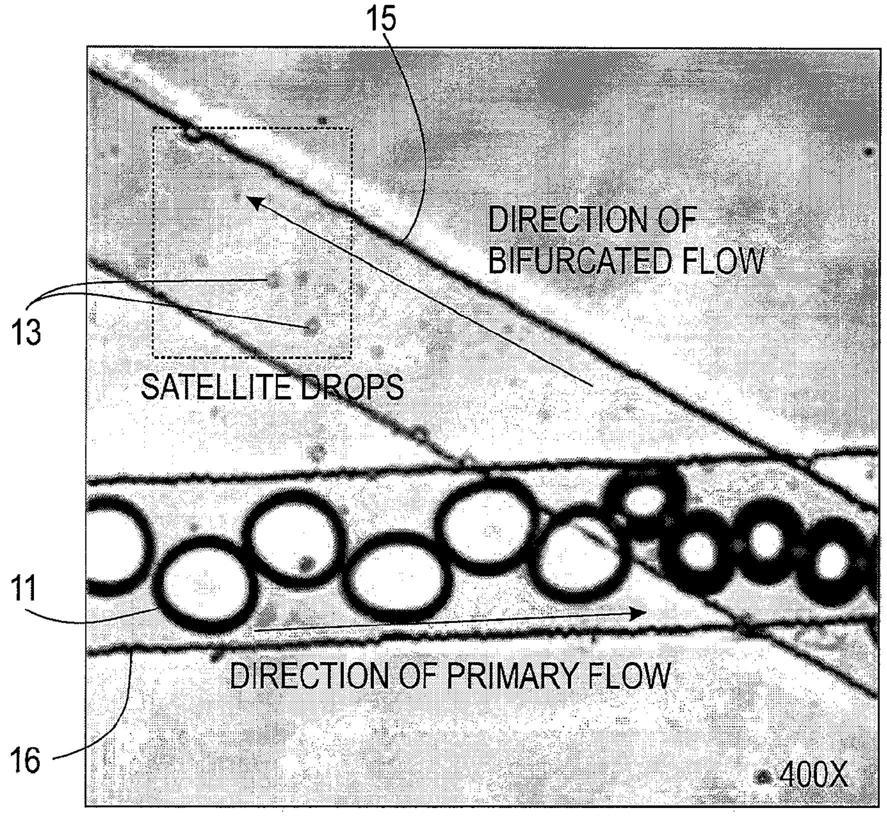
FIG. 2 is a photograph showing an alternative design of a satellite droplet filtration system.
Figure 3:
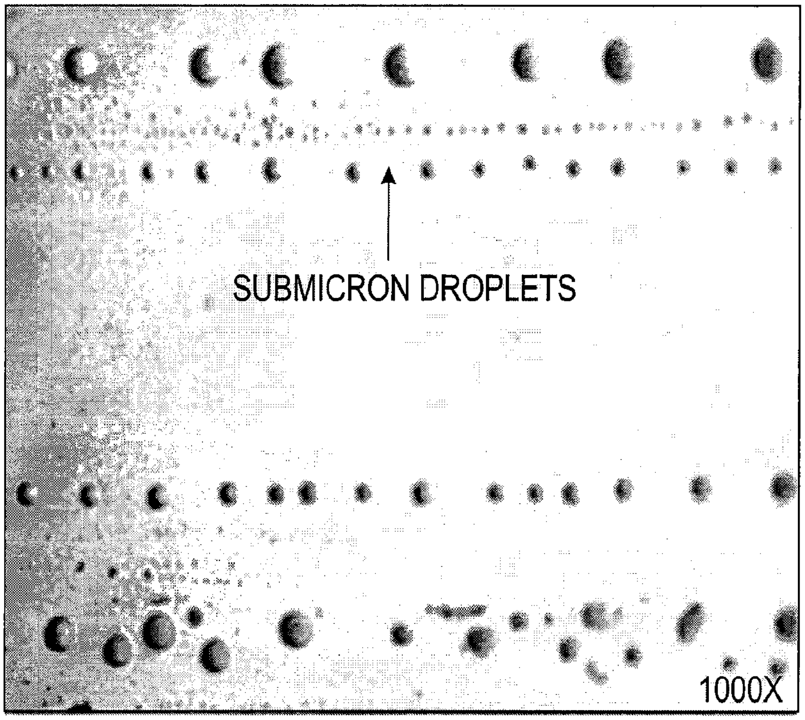
FIG. 3 a photograph showing satellite droplets of different sizes and parent or primary droplets in a bifurcated flow.

In the filtration devices shown in FIGS. 1 and 2, the separation of droplets is passive. One simply attaches the filtration device to the generation of droplets to filter out the different sized droplets into separate reservoirs or other locations. As shown in FIG. 3, satellite droplets of different sizes and parent or primary droplets are shown in a bifurcated flow. With a light microscopy of 1000× magnification, the sizes of satellite droplets are measured to range from 100 nm to several microns in diameter, demonstrating that nano-sized droplets can be created through the satellite droplet generation process.

Unlike parent droplets with sizes comparable to the microchannel cross-section dimensions, the small surface area of the satellite droplet is insufficient to produce a force difference that transports droplets according to shear gradients, but instead localizes satellite droplets in the same relative cross channel position through out the channel. To separate all the satellite droplets from the parent droplets, a two layered PDMS channel structure 10 illustrated in FIG. 1 is used. PDMS channels with preferably a 10:1 polymer/curing agent ratio are fabricated using a SU-8 mold and bonded to a clean soda lime glass after oxygen plasma treatment. The inner surface of the channel is preferably coated with a layer of tri-cholorosilane to ensure hydrophobicity of the surfaces. The channel inlets are preferably connected to syringe pumps controlling the liquid flow rates of the water and oil phases. (See FIG. 4 for channel inlets and droplet generation zone). For demonstration purposes, ultra-purified D1 water is used as the dispersed phase while the oil used was oleic acid purchased from Sigma-Aldrich (viscosity 27.64 mPa, interfacial tension 15.6 dyn cm21). However, one skilled in the art would readily recognize that any oil solution would work. The images shown in the figures were recorded with photron-1000 fast speed imaging system (Photron Inc.) and the measurements were taken from the recorded images using MetaMorph ver. 6.0 imaging analysis system. Droplet sizes in pixels are measured using the integrated morphometry analysis tools, and the positions of droplet breakup across the channel are measured using the line scan tools.

FIG. 1(*a*) provides an overview of the schematics of the device 10. FIG. (b) is an enlargement of the magnified region in FIG. 1(*a*) detailing the structure of the bottom reservoir 18. FIG. 1(*c*) are photos demonstrating the sorting and filtering of satellite droplets 13 from the parent droplets 11. Referring to FIG. 1(*a*), the top PDMS structure 10 contains a channel 16 for generating droplets and collecting parent droplets 11. The separation region in the top PDMS layer 12 has a channel 16, which connects to a large circular reservoir 18 in the bottom PDMS layer 14. In a demonstrative device, the width of the channel was about 77 μm and the diameter of the reservoir was about 5 mm. At the end of the top channel 16 and the center of the bottom reservoir 18, two outlets 20 and 22 are punctured to collect parent droplets 11 at the top outlet 20 and satellite droplets 13 at the bottom outlet 22. The flow bifurcates at the point indicated by the dashed line in FIG. 1(*c*), and the shear rate in the upper channel 16 is greater than the shear rate exiting the bottom reservoir 18. This creates two competing forces each proportional to or a function of the shear rate and the surface area of the droplet exposed to each of the bifurcated streams at the junction of the channel 16 and the reservoir 18; thus parent droplets 11 with a larger surface area are transported toward the top outlet 20 while leaving all the satellite droplets 13 dispersed into the bottom PDMS reservoir 18. Since the area of filtration is effective over the entire cross section of the channel 16, the collection of satellite droplets 13 is independent of the droplet generating position. This is crucial for the filtration of satellite droplets in many applications that require reagent mixing near the droplet breakup point as slight variations in the position of breakup would result in varying ratios of reagents mixed into the final droplets.

Referring to FIG. 2, an alternative design for a filtration system is shown to include a second or bifurcated flow channel 15 that traverses the primary flow channel 16.

Figure 4:
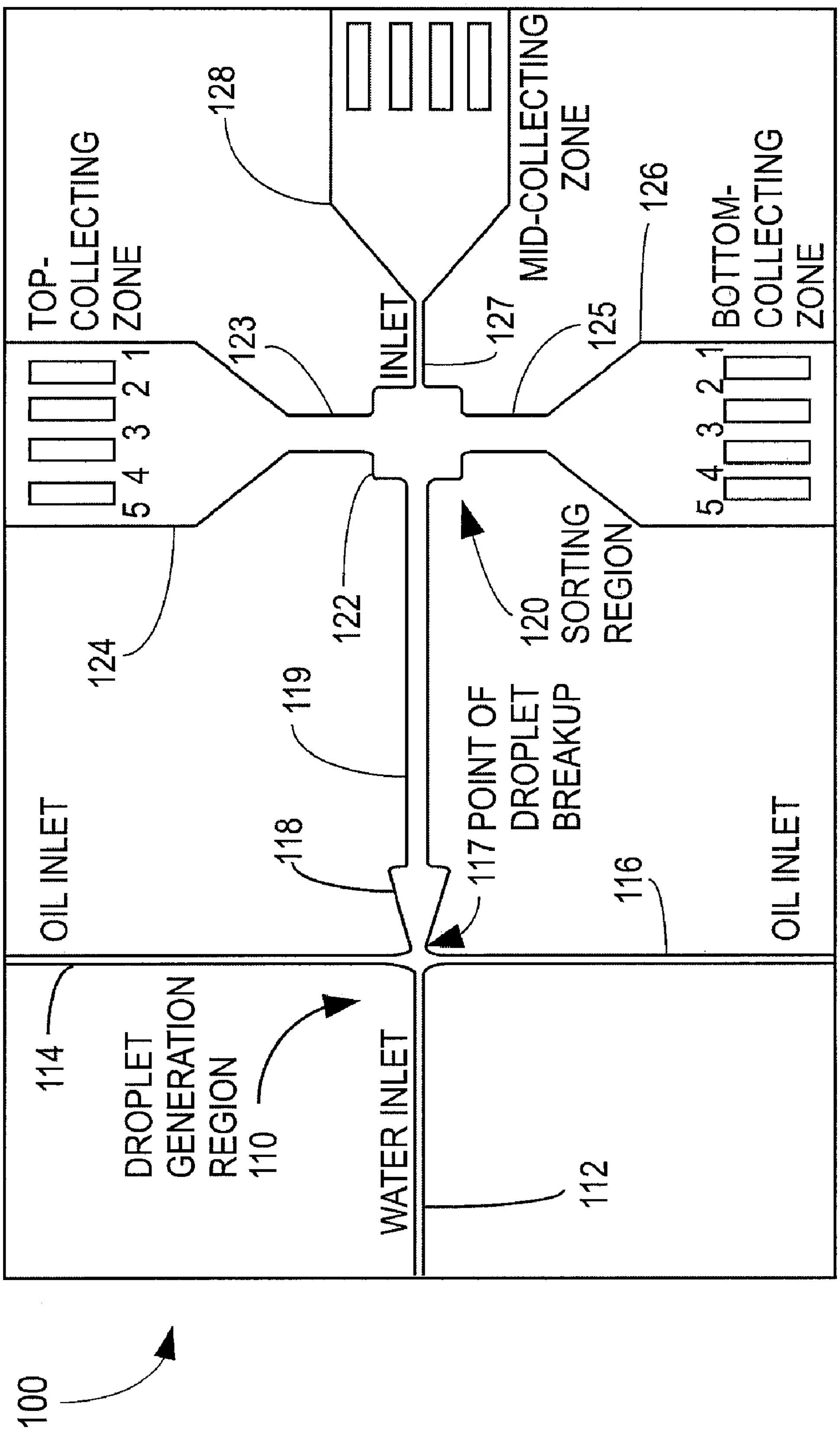
FIG. 4 is a schematic of a sorting device for satellite droplets that includes a droplet generation region and a sorting or separating region. The sorting region separates the satellite droplets according to their position across the width of the channel. Primary droplets are sorted into the mid-collecting zone while the satellite droplets can be switched into either the top or bottom collecting zone.

A design of the controllable, active or dynamic satellite separation system 100 is shown in FIG. 4. The system 100 for controlling the dynamic separation of droplets of different sizes includes a droplet generation region 110 and a separation region 120 connected across an elongate channel 119. The droplet generation region 110 includes a first inlet 112 through which water or dispersed phase is injected and a pair of opposing second inlets 114 and 116 through which an oil or continuous phase is injected. The junction of the three inlets open into a droplet generation channel 118 which is connected to an elongate outlet channel 119.

The separation region 120 separates the satellite droplets according to their position across the width of the channel 118. The separation region 120 has a channel 122, which in a demonstration device measured about 503 mm×503 mm, and divides the flow into three different collecting zones of equal resistances. Parent droplets are collected into the mid-collecting zone 128 exiting the channel 122 through inlet channel 127. The inlet channel 127 of the mid-collecting zone 128 has a narrow width to enhance the force created by the difference in shear rates between the inlet channels 123, 125 and 127 at the separation region 120 to improve the efficiency of separating droplets by size.

Figure 9:
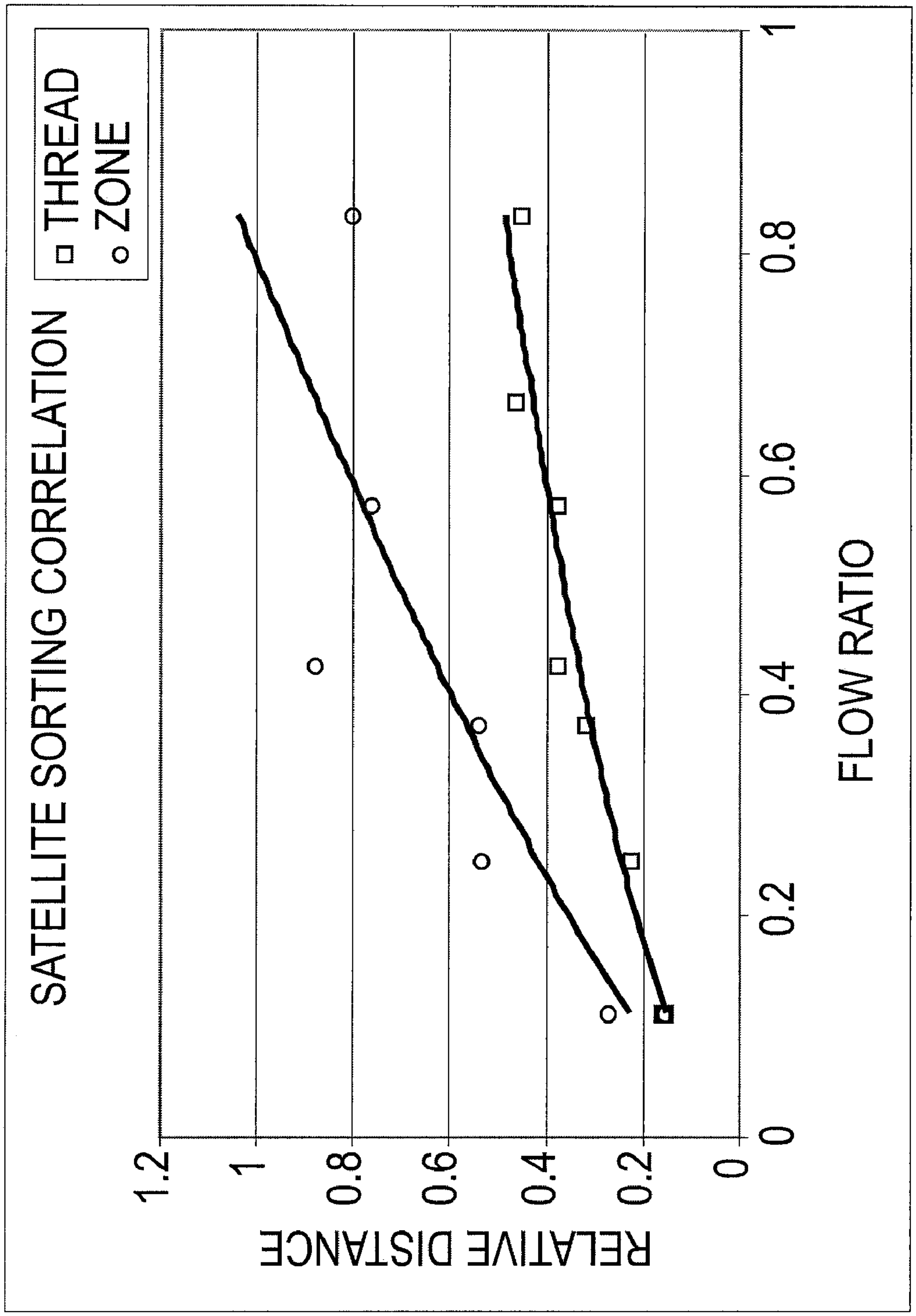
FIG. 9 is a graph illustrating the correlation between inlet flow ratio, the distance from channel center of the liquid thread and the sorting position of satellite droplets in the sorting zone.

The top and bottom collecting zones 124 and 126 are used to collect droplets of a smaller size such as satellite droplets. The satellite droplets can be switched into either the top or bottom collecting zones 124 or 126 exiting the separation channel 122 through inlet channels 123 and 125. The satellite stream can also be switched to either the top or the bottom zone to allow satellite droplets to undergo different analytical procedures (See FIGS. 9*a* and 9*b*). Since satellite droplets are formed either during the pinch off of the liquid thread 105 or through a series of breakups led by Rayleigh instability, satellite droplets are created at the same channel-cross position as the liquid thread 105 (see FIGS. 5*a* and 5*b*). Through controlling the hydrodynamic stresses on the liquid thread 105, the location for the thread breakup can be positioned to generate satellite droplets at any location across the width of the outlet channel 118. With an imbalance of stresses, the liquid thread 105 shifts toward a region of lower stress as demonstrated in FIG. 5*b*.

At the point of generation 117, the position of the liquid thread 105 controls the precision of satellite droplet collection. Under symmetrically balanced flow conditions, which are denoted by (5.0:5.0) in FIG. 5*a* to indicate that the flow rates for the top and bottom oil inlets 114 and 116 respectively are both 5 μL/min, separation of satellite droplet is unpredictable. The satellite droplets 113 generated from the center 115 of the channel may follow the path of the parent droplet or may randomly distribute toward either one of the side collecting zones 124 and 126. When the thread is positioned near either the top or bottom side of the channel 118 as indicated in FIG. 5*b*, the resulting satellite droplets 113 also move into the respective side collection zone. By shifting the liquid thread slightly from the center of the channel, smaller satellite droplets can also be separated from the larger satellite droplets as discussed in regard to FIGS. 6*a* and 6*b* below.

Figure 5A:
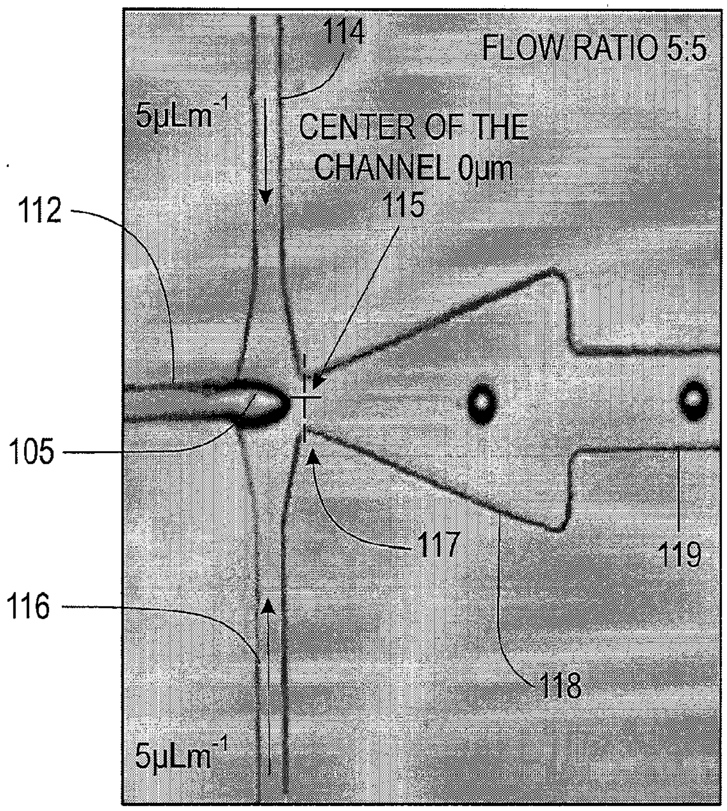
FIGS. 5*a* and 5*b* are photographs of the generation region showing the generation of a liquid thread and the effect of flow ratio stress on the liquid thread.
Figure 5B:
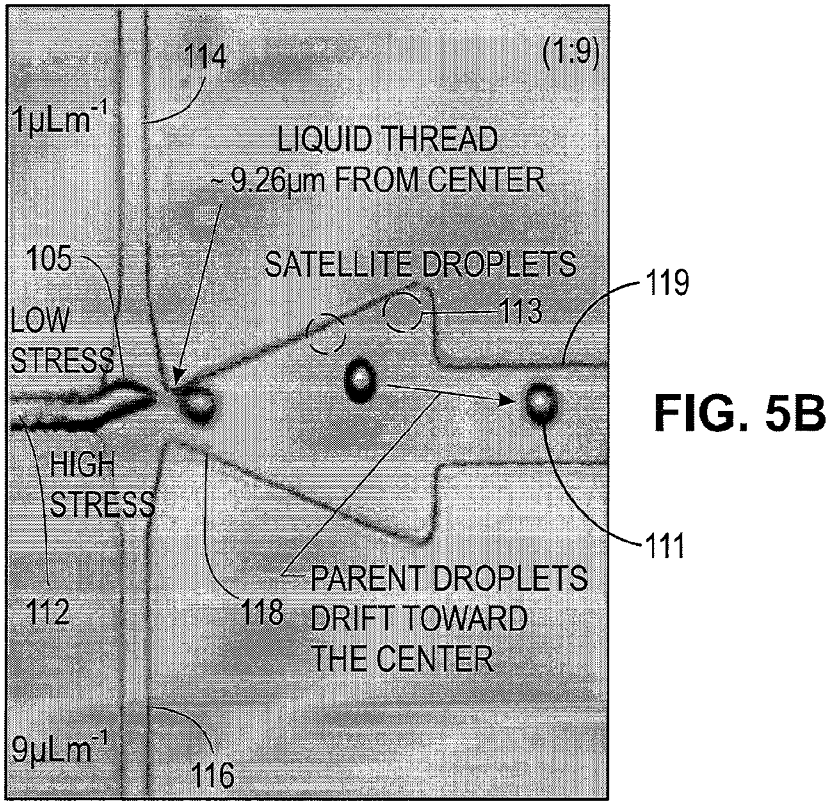
Figure 5C:
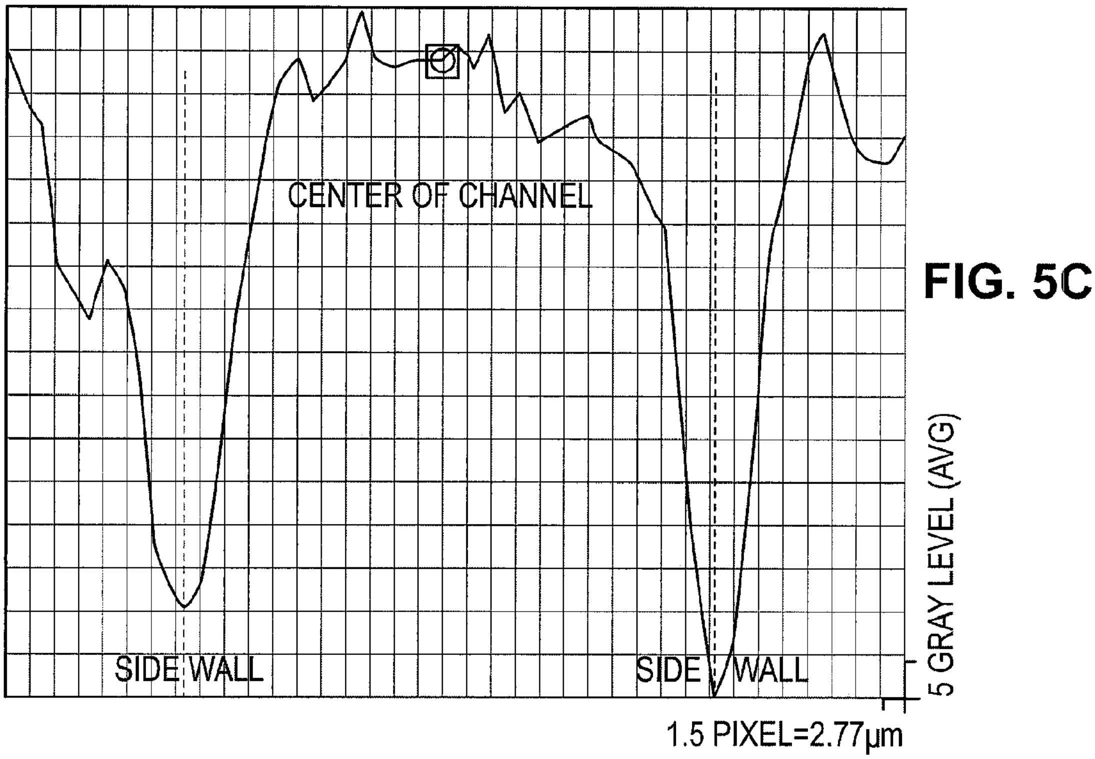
FIGS. 5*c* and 5*d* are graphical representations of FIGS. 5*a* and 5*b* respective.
Figure 5D:
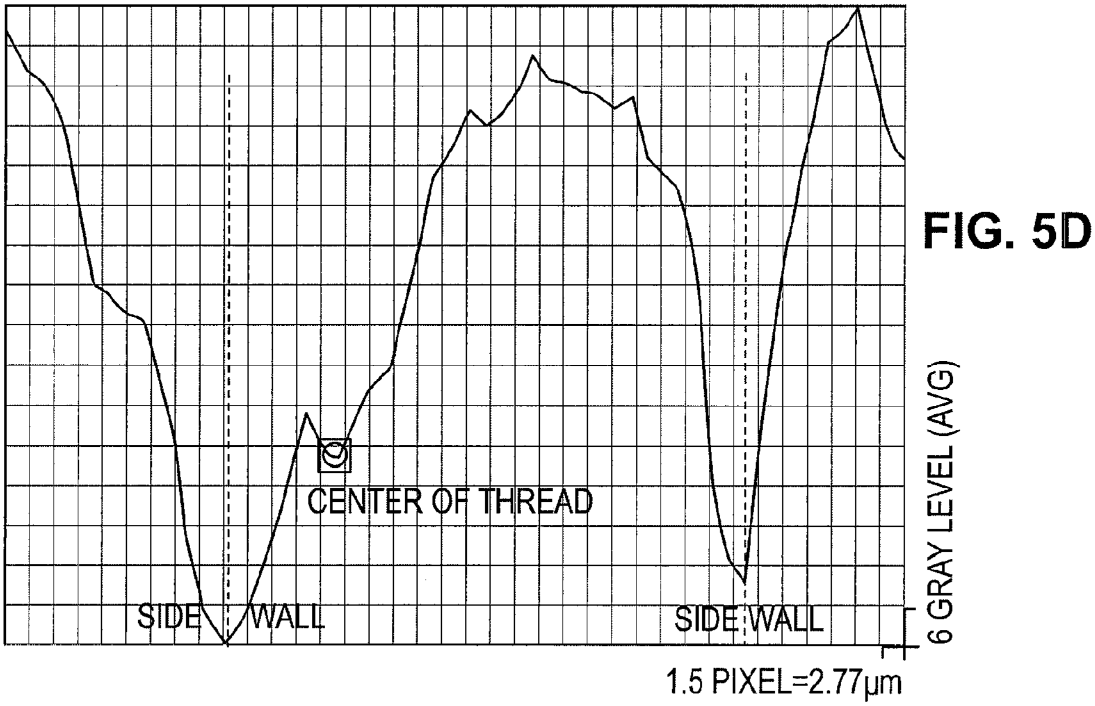

As shown in FIG. 5*a*, the center 115 of the channel 118 at the generation point 117 is marked and it is calibrated into the pixel position in FIG. 5*c*. The pixel position translates into actual in channel position by the calibration factor in FIG. 5*c*, and the two peaks in the figure indicate the shade increase of the side walls of the channel 118. FIG. 5*b* demonstrates the effect of shear stress imbalance on the liquid thread. As the flow is increased from a center position of (5.0 μL $min^{-1}$:5.0 μL $min^{-1}$) to an off center position of (1.0 μL $min^{-1}$:9.0 μL $min^{-1}$), the liquid thread 105 shifts 19.9 μm from the center to the top side of the channel 118. As a result, the satellite droplets 113 tend to drift along the top side of the channel 118 as the parent droplets 111 tend to drift toward the center of the channel 118.

Figure 6A:
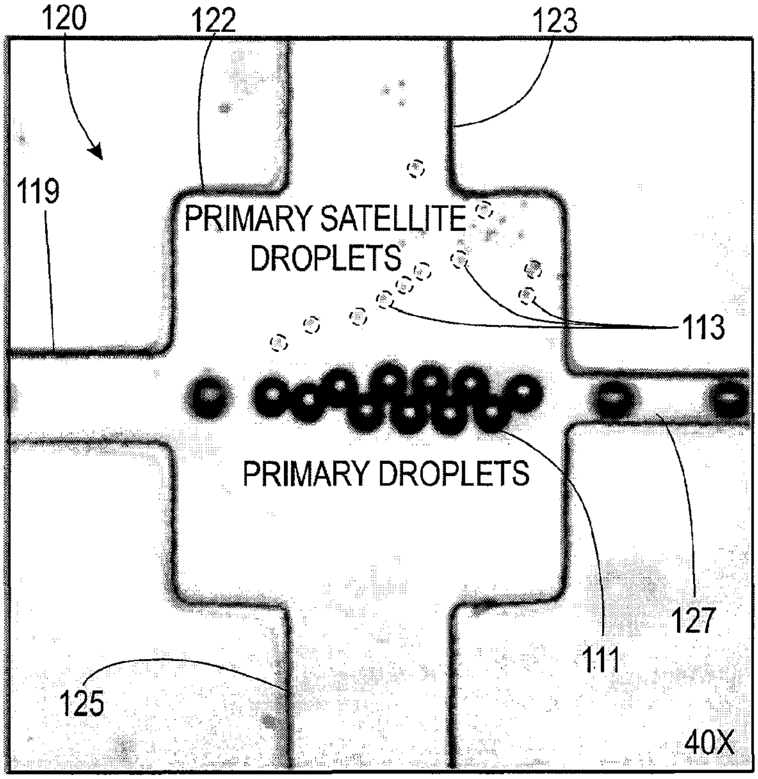
FIGS. 6*a* and 6*b* are photographs of the sorting zone illustrating the sorting of primary satellite droplets and secondary satellite droplets through slight shifts of the liquid thread from the neutral position.
Figure 6B:
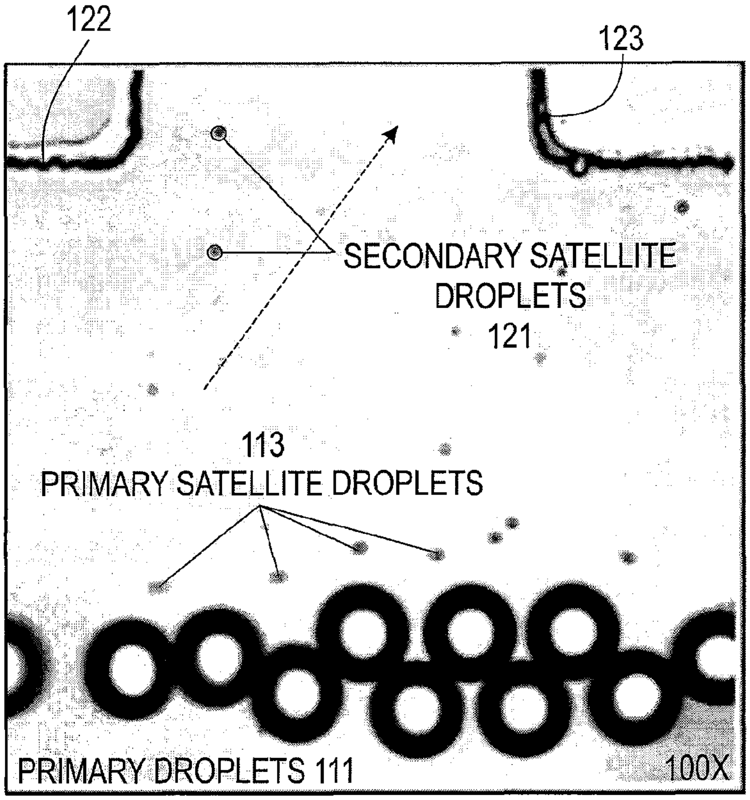

As noted above, under symmetrically balanced flow conditions with the oil flow rates adjusted to be (5.0:5.0) while the water flow rate is kept at 0.5 μL/min, the parent droplets are focused into the mid-collecting zone, but the satellite droplets are randomly distributed into either the top, mid, or bottom zone. While a steady stream of droplets is being generated, the oil flows can be adjusted into specific ratios to shift the liquid thread 105 to different locations across the width of the channel 118. Sorting of primary satellite droplets 113 and secondary satellite droplets 121 is achieved through only a slight shift of the liquid thread 105 from the neutral position. The sorting is sensitive to small perturbations that cause the primary satellite droplets 113 to occasionally move into the top collecting zone to mix with secondary satellite droplets, as shown in FIG. 6A, or move into the mid collecting zone, as shown in FIG. 6*b*, to separate from secondary satellite droplets 121. At (4.0:6.0), as shown in FIG. 6*b*, the net stress exerted by the flows shifts the droplet generation 2 mm away from the center of the channel 118 and causes the separation of secondary satellite droplets 121 from the primary satellite droplets 113. The top zone 124 collects the secondary satellite droplets 121 while the mid zone collects the parent droplets 111 and the primary satellite droplets 113.

Figure 7A:
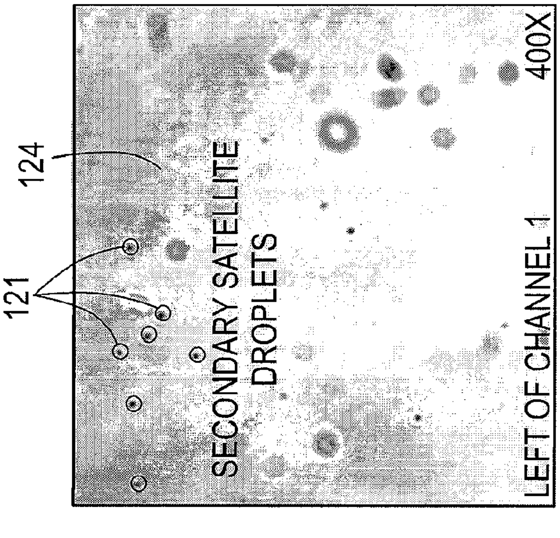
FIGS. 7*a*, 7*b* and 7*c* are photographs of the sorting zone illustrating the sorting of primary satellite droplets and secondary satellite droplets in a slightly larger channel.
Figure 7B:
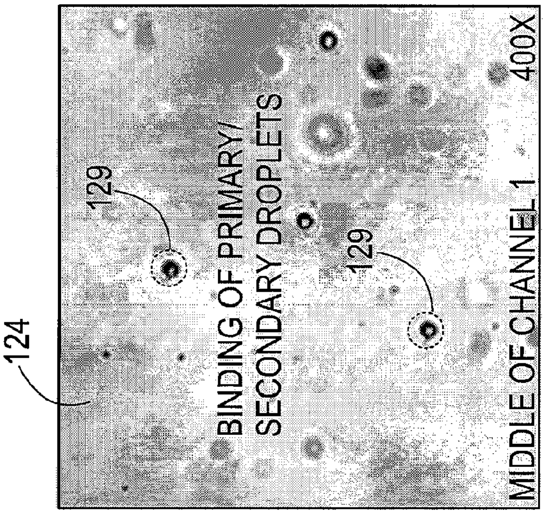
Figure 7C:
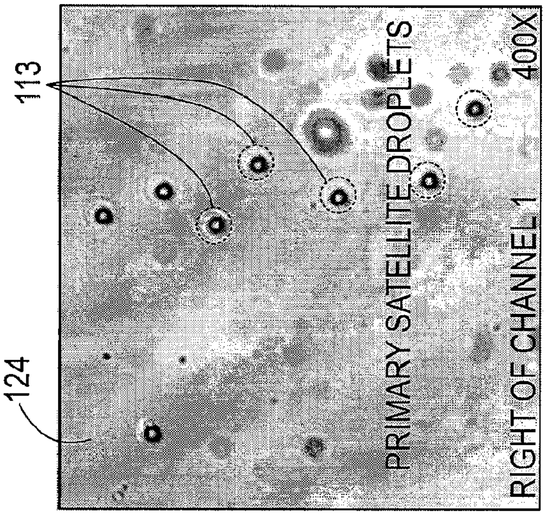

Referring to FIGS. 7*a*, 7*b* and 7*c*, in a slightly enlarged channel (75 μm at generation and 213 μm and 63 μm at inlets of collection zones), at (5.0:6.0) the separation of the primary satellite droplets 113 and secondary satellite droplets 121 are observed in the top collecting zone 124 with a stream of fused droplets 129 in between. The fused droplets 129 consist of the attachment of a secondary satellite droplets 121 to primary satellite droplets 113. The satellite droplets are all found within channel 1. The secondary satellite droplets 121 are located toward the left in channel 1 and the primary satellite droplets 113 are located toward the right in channel 1. The middle region in channel 1 contains both types of satellite droplets attached to each other.

Figure 8A:
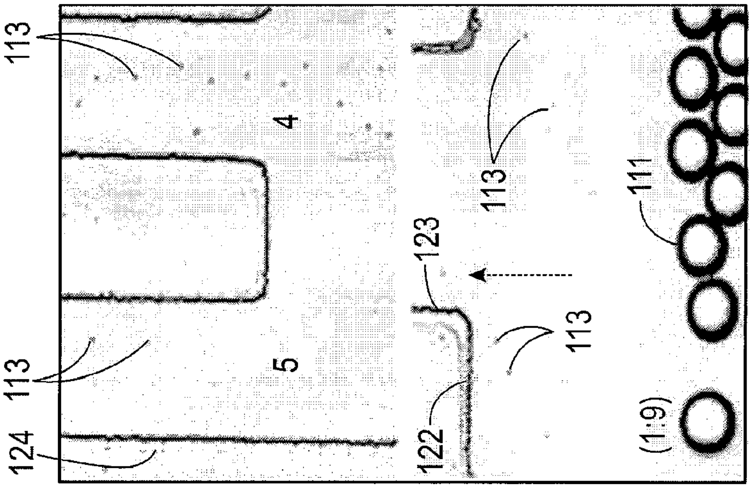
FIGS. 8. 8*a*, 8*b* and 8*c* are photographs showing the sorted position of satellite droplets in the top collecting zone shifting from channel 1 to 5 as shown in the figure ordered from right to left as the position of the liquid thread changes according to the flow ratio.
Figure 8B:
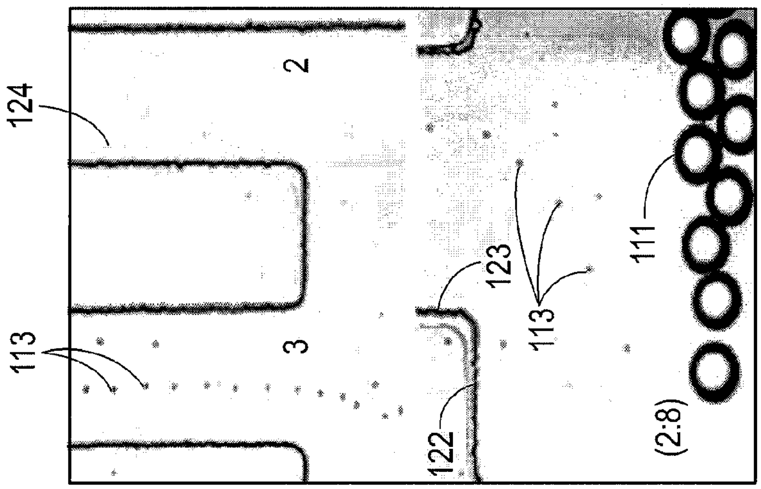
Figure 8C:
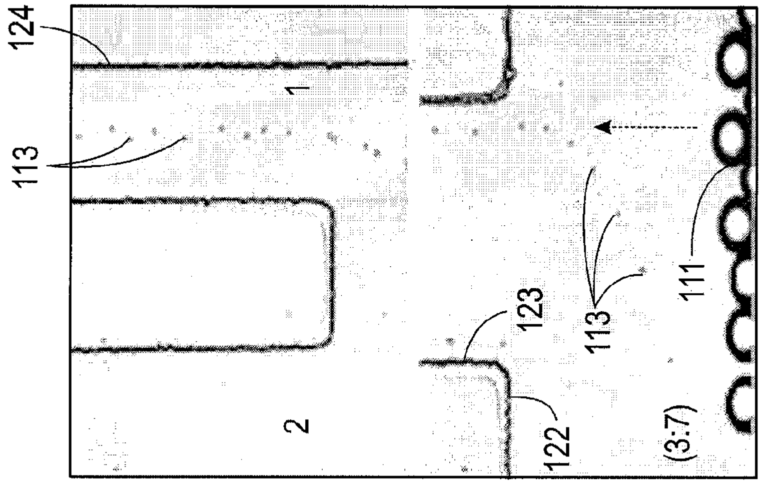

As noted above, the position of the liquid thread 105 changes according to the flow ratio. In all trials, as the flow rate is adjusted in steps from (4.0:6.0) to (1.0:9.0) with a variation of 1 μL/min difference per step, the separation of parent droplets 111 and satellite droplets 113 is clearly distinguishable. As shown in FIGS. 8*a*, 8*b* and 8*c*, within the top collecting zone 124 the satellite droplets 113 can be separated into specific numbered channels according to the flow ratio. In repeated trials, the satellite droplets were identified at flow ratio of 3.0:7.0 in either channel 1 or 2 as shown in FIG. 8*c*, at flow ratio of 2.0:8.0 in either channel 2 or 3 as shown in FIG. 8*b*, and at flow ratio of 1.0:9.0 in either channel 4 or 5 as shown in FIG. 8*a*. The shifting of satellite droplets from channel 1 to channel 5 indicates that the location of satellite droplet is controllable by or is a function of the flow ratio. Furthermore, since the distance of shift in the position of the liquid thread 105 is controlled by the flow ratio, it further verifies that the position of the satellite droplet changes with the position of liquid thread 105. The position of the liquid thread 105 and the location of the satellite droplet 113 are made comparable using the relative position of the liquid thread 105 and the satellite droplets 113 inside the channel 118. Relative position is calculated for the thread 105 as the distance from the center 115 of the channel 118 divided by the local channel width and for the collecting zone as the distance from the left channel wall (5-1 direction) divided by the width of the inlet (see FIG. 4). The result shown in FIG. 9 verifies that the position of droplet in the collecting zone is proportional to the position of the thread and that the shifting of the thread is proportional to the ratio of flows. As the flow ratio increases, the liquid thread moves away from the center of the channel causing the increasing shift of the position of the satellite droplet in the sorting zone.

Figure 10A:
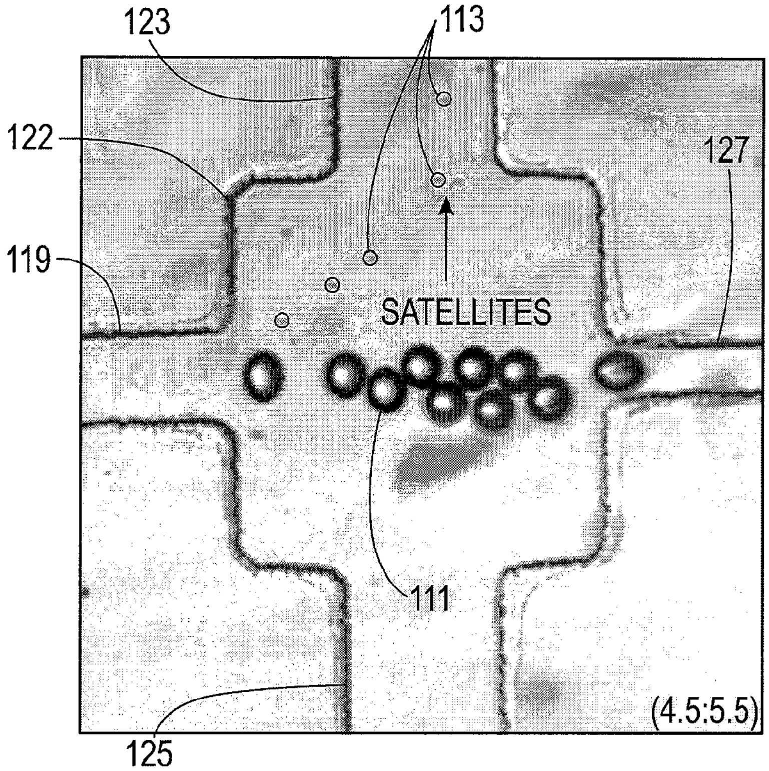
FIGS. 10*a* and 10*b* are photographs showing the collection of satellite droplets being switched from the top collecting zone to the bottom collecting zone as a function of inlet flow ratios.
Figure 10B:
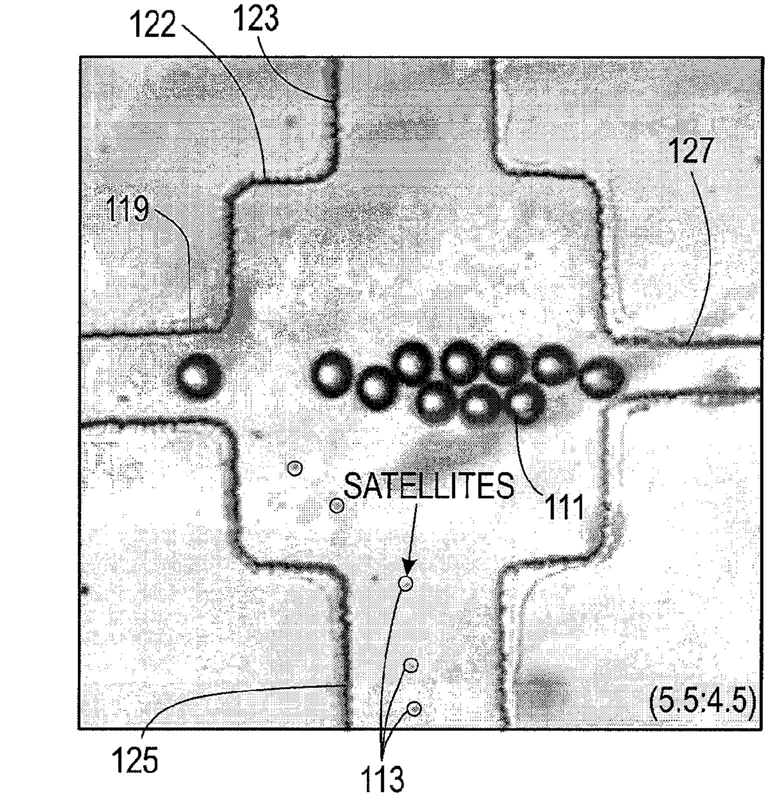

As shown in FIGS. 10*a* and 10*b*, satellite droplets 113 can be switched from the top collecting zone 124 to the bottom collecting zone 126 as the flow ratio is switched from, e.g., 4.5:5.5 to 5.5:4.5. Droplet switching time is the time it takes to move a steady stream of satellite droplets from one collecting zone to the opposite collecting zone. It is measured immediately after flow rates are switched into the reciprocal ratio of the current flow. As the flow condition switches from (4.5:5.5) to (5.5:4.5), the satellite stream shifts from the top zone into a split at the top corner of the separation region. The satellite stream then shifts continuously from the mid zone to the bottom collecting zone. The time for the switching event depends on the movement speed of the liquid thread from one location to the next and is thus dependent on the magnitude of the shear stress that is proportional to the oil flow rates. In accordance with the magnitude of the shear stress generated by the oil phases, the average switching time is shorter for a higher flow rate difference: 68.4 s (4.5:5.5)>57.8 s (2.0:7.0) >53.5 s (1.0:8.0).

According to Tjahjadi et al., J. Fluid Mech., 1992, 243, 297, the sizes and the number of the satellite droplets produced depends primarily on the viscosity ratio, defined as the viscosity of the dispersed phase over the viscosity of the continuous phase. In a preferred embodiment, the viscosity ratio is ~$3.6179\times10^{-2}$, and three distinctive types of satellite droplets are measurable with an imaging system noted above. All satellite droplets are formed after the breakup of the parent droplet. Due to limitation of the imaging system, the generation of smaller satellite droplets cannot be detected, and as a result the three observable satellite droplets are identified according to their sizes instead of their order of formation, and they are ranked from large to small as primary satellite droplets, secondary satellite droplets, and tertiary satellite droplets. In contrast to the sizes of the generated parent droplets, no significant size variations are observed when the flow rates of the water and oil phases are varied. While this may be due to the small difference that is beyond the measurable precision of the instruments, it may also be due to the breakup mechanism which is driven by the surface instabilities of the liquid neck that connects between the parent droplet and the liquid thread during the periodic droplet breakup events, and this will the subject of future investigations.

Figure 11A:
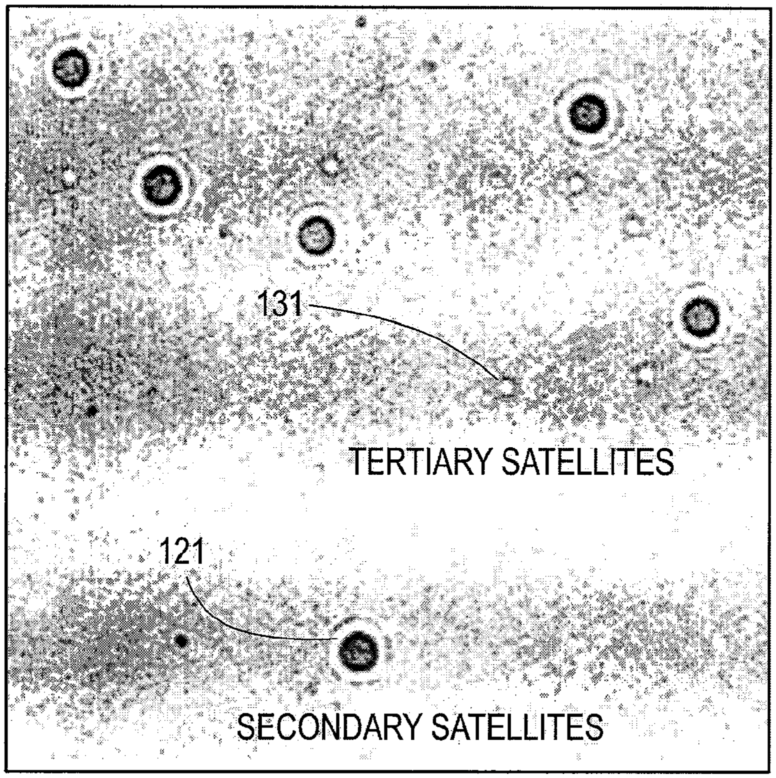
FIGS. 11*a* and 11*b* are photographs showing the presence of monodispersed secondary satellite droplets and tertiary satellite droplets.
Figure 11B:
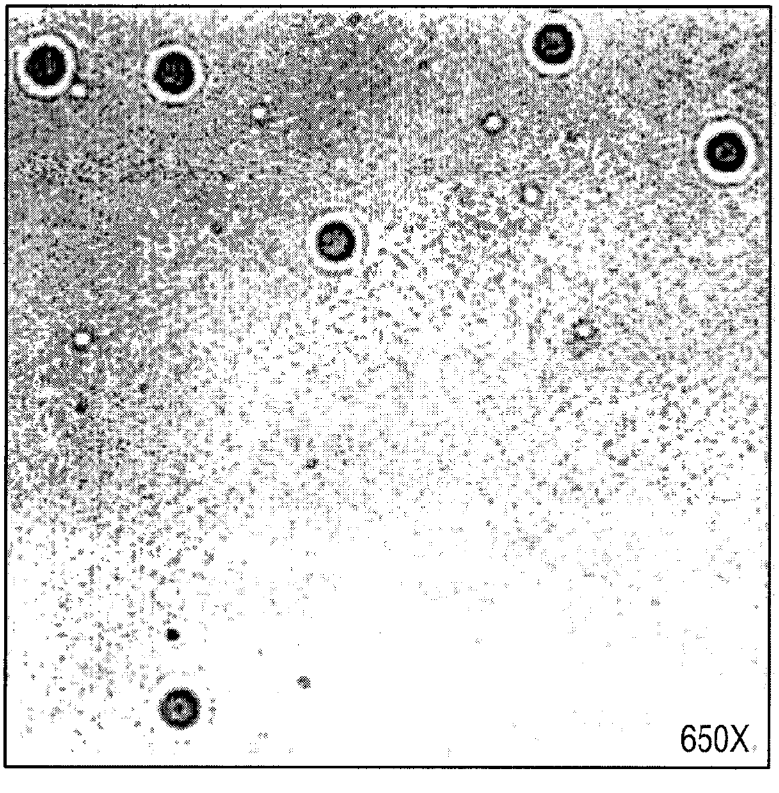

FIGS. 11*a* and 11*b* show the presence of monodispersed secondary 121 and tertiary 131 satellite droplets. The tertiary satellite droplets 131 are observed to be mixed with the secondary satellite droplets 121 at various locations. These tertiary satellite droplets may be separable at different flow ratios, but it is difficult to track with the current imaging system. At 630× magnifications, small position differences require large adjustments in focus, which limits the consistency in measuring the exact size of individual droplets. This contributes to the increase in variations in the measurements for smaller droplet sizes.

The radii of droplets are averaged over several trials. The weighted average for the 444 measured primary satellite droplets is 2.23±0.11 μm, for the 310 secondary satellite droplets the average is 1.55±0.07 μm, and for the 338 tertiary-satellite droplets the measured size is 372±46 nm. Overall, there is an even narrower distribution in droplet sizes measured within the same trial.

The satellite filtering and separation techniques presented here can be easily incorporated into passive or active microfluidic devices. The filtration and separation of satellite droplets are controlled by the flow within the vicinity of droplets. This can be reproduced when similar flow types are present in devices with active and passive elements to incorporate valves, electrodes, pumps, and other fluidic elements into one integral unit for a wide range of applications in the emulsion, drug, and various biomedical/pharmaceutical industries. On one hand, the two layer filtration method offers a simple solution to remove undesirable satellite droplets from mixing into the droplet population, and thereby increase the purity of the droplet generation system. On the other hand, the interface near the singularity of liquid thread produces nano-scale droplets and can be the basis for monodispersed production of submicron satellite droplets. The satellite droplet separation device presented here takes advantage of this production mechanism to collect monodispersed submicron emulsions during one single breakup event. The monodispersity of these miniature carriers can enable future applications such as single molecule reaction vessels and nano-particle synthesis systems.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed:

1. A method for separating and collecting satellite droplets from a flow of fluid comprising primary and satellite droplets dispersed within the fluid, comprising the steps of injecting a flow of fluid through a channel, wherein primary and satellite droplets are dispersed within the fluid which have been generated by breakup of a liquid thread in the channel, bifurcating the flow of fluid into first and second bifurcated streams, separating the satellite droplets from the primary droplets as a function of fluid flow shear rates of the first and second bifurcated streams, adjustment of location of the thread breakup across the width of the channel and droplet surface area of droplets exposed to each of the bifurcated streams, collecting the satellite droplets in a first collection zone, and collecting the primary droplets in a second collection zone.

2. The method of claim 1 wherein the satellite droplets range in size from microns to less than 100 nm.

3. The method of claim 1 wherein the collected satellite droplets are monodispersed.

4. The method of claim 1 wherein the channel is enclosed within a plate, the channel having an inlet at a first end, the channel communicates at a second end to a first outlet above the channel and a reservoir below the channel, the reservoir having a diameter greater than the width of the channel and a second outlet formed at the bottom of the reservoir.

5. The method of claim 4 wherein the diameter of the reservoir is greater than fifty times the width of the channel.

6. A method for separating and collecting satellite droplets from a flow of fluid comprising primary and satellite droplets dispersed within the fluid, comprising the steps of injecting a dispersed phase of liquid through a first channel having first and second ends, injecting a continuous phase of liquid through second and third channels causing the generation of primary and satellite droplets from a liquid thread of the dispersed phase of liquid, the second and third channels having first and second ends, wherein a junction of the first, second and third channels at a second end of the first, second and third opens into a droplet generation channel in which a breakup of the liquid thread occurs, wherein the primary and satellite droplets are dispersed within the continuous phase of, adjusting the flow ratio of the continuous phase through the second and third channels to separate the primary and satellite droplets, adjustment of location of the thread breakup across the width of the droplet generation channel, collecting the satellite droplets in a first collection zone, and collecting the primary droplets in a second collection zone.

7. The method of claim 6 further comprising the step of reversing the flow ratio to switch the collection location of the satellite droplets.

8. A method for separating and collecting satellite droplets from a flow of fluid comprising primary and satellite droplets dispersed within the fluid, comprising the steps of injecting a first flow of fluid through a primary channel, wherein the first flow of fluid comprises a liquid with primary and satellite droplets dispersed within the fluid which have been generated by breakup of a liquid thread in the channel, injecting a second flow of fluid through a secondary channel, wherein the second flow of fluid comprises a continuous phase of the liquid of the first flow of fluid without primary and satellite droplets, wherein the secondary channel traverses the primary channel, separating the satellite droplets from the primary droplets as a function of fluid flow shear rates of the first and second flows of fluid, adjustment of location of the thread breakup across the width of the channel and droplet surface area of droplets exposed to each of the first and second flows of fluid, collecting the satellite droplets in a first collection zone, and collecting the primary droplets in a second collection zone.

9. The method of claim 8 wherein the satellite droplets range in size from microns to less than 100 nm.

10. The method of claim 8 wherein the collected satellite droplets are monodispersed.

* * * * *